Aug. 1, 1933.    C. CATTANEO    1,920,839
POINTING DEVICE FOR STONE CARVERS
Filed May 4, 1929    2 Sheets-Sheet 1
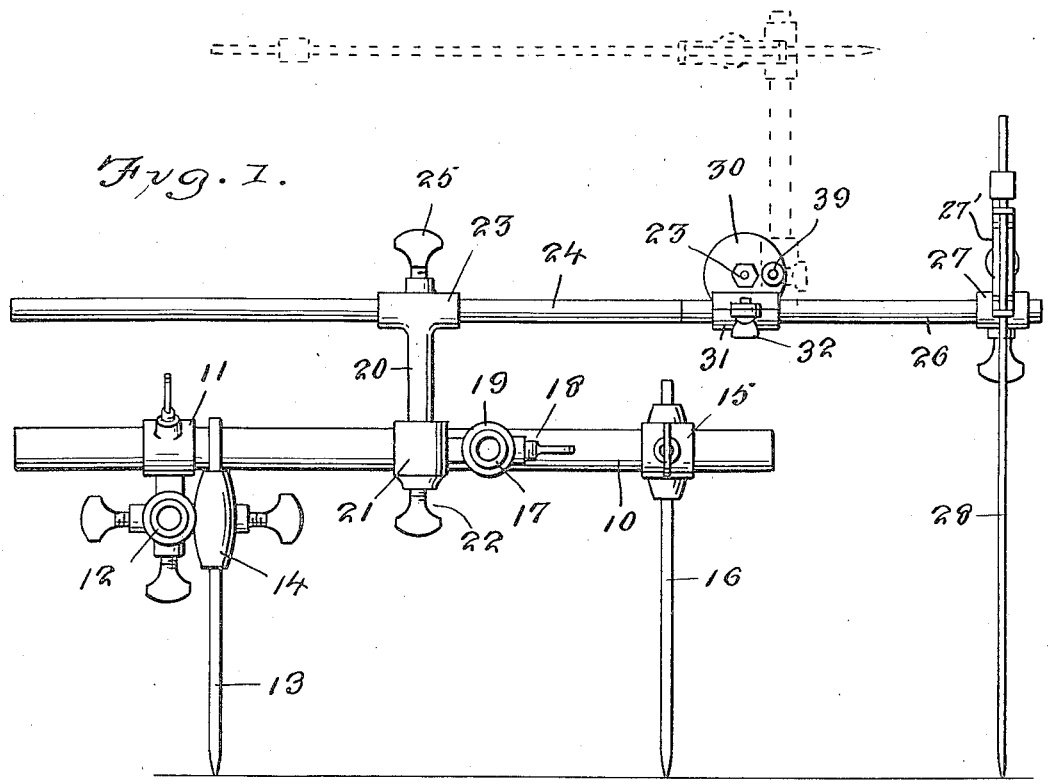
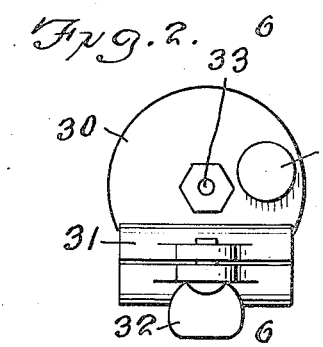
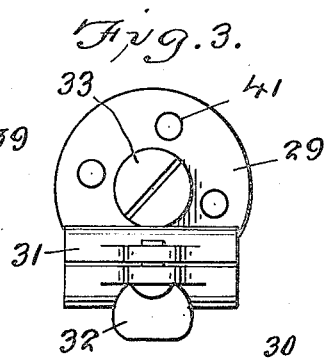
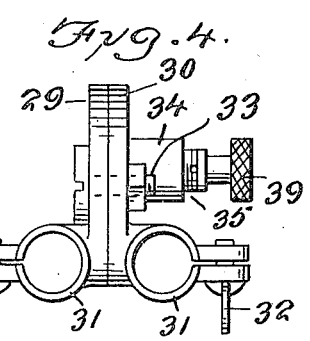
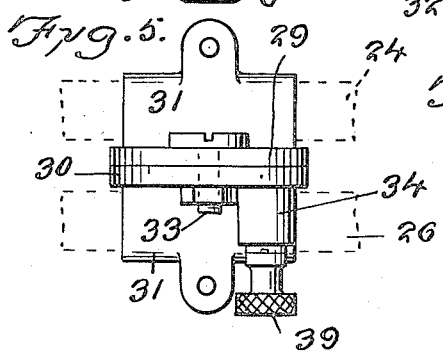
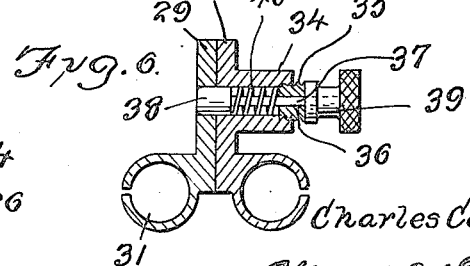

Patented Aug. 1, 1933

1,920,839

UNITED STATES PATENT OFFICE 1,920,839

POINTING DEVICE FOR STONE CARVERS

Charles Cattaneo, South Norwalk, Conn.

Application May 4, 1929. Serial No. 360,552

1 Claim. (Cl. 33—174)

This invention relates to measuring or pointing instruments intended for the use of stone carvers, an object being to provide an instrument by means of which measurements may be taken from a model and transferred to a stone to indicate a particular point in the work, and the pointer moved without disturbing the position of the instrument upon the stone, so that the said pointer may be moved out of the way and returned to position as often as desired.

To this end, the invention provides a sectional pointer bar having means to connect the sections, whereby one of said sections may be swung pivotally, or held against pivotal movement.

With the above and other objects in view, the invention further includes the following novel features and details of construction to be hereinafter more fully described, illustrated in the accompanying drawings and pointed out in the appended claim.

In the drawings:—

Figure 1 is an elevation of a measuring or pointing instrument with the invention applied.

Figure 2 is an enlarged elevation of the adjustable coupling for the pointer arm sections.

Figure 3 is an elevation looking at the opposite side from that shown in Figure 2.

Figure 4 is an edge view.

Figure 5 is a plan view with fragmentary portions of the sections of the pointer bar shown by dotted lines.

Figure 6 is a section on the line 6—6 of Figure 2.

Figure 7:
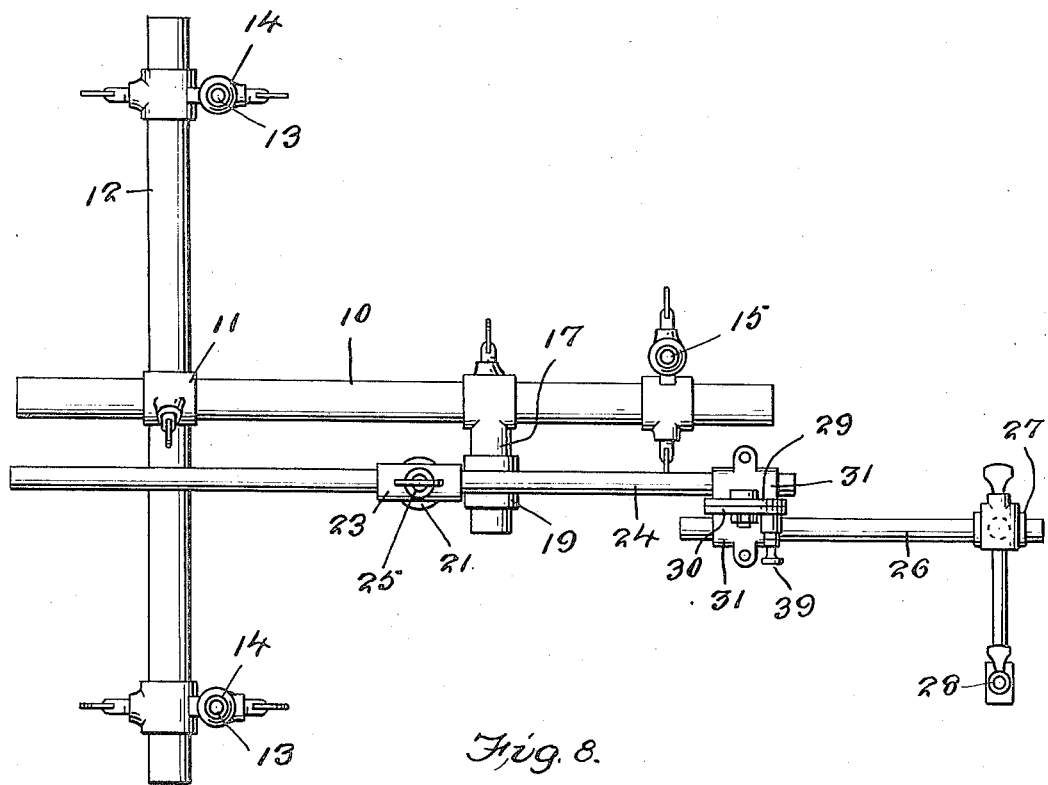
Figure 7 is a top plan view of a measuring or pointing instrument illustrating the invention.
Figure 8:
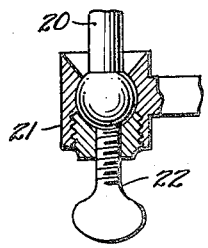
Figure 8 is a detail sectional view illustrating a universal connection between the pointer supporting arm and the support.

Referring to the drawings in detail wherein like characters of reference denote corresponding parts, the reference character 10 indicates a bar to which is adjustably secured as shown at 11, a bar 12. This last mentioned bar is supported by legs 13 which are adjustably attached to the bar 12 as shown at 14. The bar 10 has adjustably secured thereto as shown at 15 a leg 16 and these legs 13 and 16 provide a tripod which supports the pointer arm. For this purpose, the leg 10 has extending therefrom a stud 17 while pivotally and adjustably mounted upon this stud by means of a set screw 18 is a sleeve 19. This sleeve supports a standard 20 which is connected to the sleeve by means of a universal joint 21. A set screw 22 holds the standard 20 against accidental movement.

The upper end of the standard 20 carries a sleeve 23 and slidable within this sleeve is a sectional pointer arm, one section of which is indicated at 24. A set screw 25 holds the section 24 of the arm in adjusted position.

The pointer arm also includes a section or extension 26 which has adjustably secured thereto a collar 27 having a bracket 27' to which is slidably secured a pointer 28.

The instrument shown is used by stone carvers for the purpose of taking measurements from a model and transferring these measurements to the stone. Usually when this has been done it is necessary to remove the instrument to permit the carver to work and during the carving operation, the instrument must be replaced from time to time. This consumes considerable time as the instrument must be accurately re-positioned each time it is removed.

In order to overcome the foregoing and other disadvantages, the present invention provides the sectional pointer arm and means for moving the pointer carrying section independently of the other section. For this purpose, the invention provides a pair of disks 29 and 30. Each of these disks carries a split sleeve 31 which sleeves slidingly receive the sections 24 and 26 of the pointer arm. Binding screws 32 serve to clamp the sleeves upon the pointer arm sections.

The disks 29 and 30 are connected for relative rotary movement by means of a pivot bolt 33, so that the outer section or extension 26 of the pointer arm may be swung upward out of the way of the carver as shown by the dotted lines in Figure 1 of the drawings.

In order to hold the outer section 26 of the pointer arm against pivotal movement, one of the disks has extending therefrom a sleeve 34 and threadedly secured within the outer end of this sleeve is a plug 35 which is provided with an opening 36. Slidable through this opening 36 is a pin 37 which carries at one end an enlargement or head 38, while the opposite end of this pin is provided with a knurled head 39. A spring 40 yieldingly forces the head 38 of the pin inward.

The other disk is provided with spaced openings 41 which are of a size to receive the head 38 of the pin and when the head is engaged within one of these openings the section 26 of the pointer arm will extend in the same horizontal plane as the section 24. By pulling the pin outward against the action of the spring 40, the head 38 may be retracted from the opening 41 so as to permit the section of the pointer arm and consequently the pointer 28 to be swung upward and held against pivotal movement by engagement of the head 38 with another of the openings 41. The pointer 28 may thus be removed to an out-of-the-way position and returned to the work as often as desired without disturbing the position of the instrument.

The invention is susceptible of various changes in its form, proportions and minor details of construction and the right is herein reserved to make such changes as properly fall within the scope of the appended claim.

Having described the invention what is claimed is:—

A pointing device for stone carvers, comprising two bars arranged in substantially T-shape and adjustably connected to each other whereby one bar may be adjusted endwise of the other bar, a pair of vertical legs adjustably connected to one of the bars adjacent the ends thereof, a third vertical leg adjustably secured to the other bar adjacent one of the ends thereof, said legs forming a three point support for the bars and each leg being adjustable vertically and horizontally relative to its respective bar, a stud adjustable endwise of one of the bars and arranged horizontally and at right angles thereto, a sleeve adjustably mounted on the first lug and arranged horizontally and at right angles thereto, a universal connection carried by the sleeve, a member carried by said universal connection and normally disposed vertically and terminating above said bars, a rod adjustably secured to said member and capable of endwise adjustment above the bars, a second rod adjustably and pivotally secured to one end portion of the first rod, and capable of adjustment endwise of the first rod and angularly thereto, a mounting adjustable on the second rod and endwise of the latter, and a pointer adjustably secured to the mounting.

CHARLES CATTANEO.